United States Patent
Kim et al.

(10) Patent No.: US 10,618,514 B2
(45) Date of Patent: Apr. 14, 2020

(54) METHOD AND APPARATUS FOR PEDESTRIAN COLLISION MITIGATION

(71) Applicants: Hyundai Motor Company, Seoul (KR); Kia Motors Corporation, Seoul (KR)

(72) Inventors: Yoon Soo Kim, Seoul (KR); Eung Seo Kim, Gyeonggi-do (KR); Suk Ki Min, Gyeonggi-do (KR); Dong Hyun Sung, Gyeonggi-do (KR); Seung Wook Park, Gyeonggi-do (KR); Yong Seok Kwon, Gyeonggi-do (KR); Sang Min Lee, Seoul (KR); Tae Young Lee, Gyeonggi-do (KR); Min Byeong Lee, Gyeonggi-do (KR); Woo Sung Kim, Gyeonggi-do (KR); In Yong Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/833,141

(22) Filed: Dec. 6, 2017

(65) Prior Publication Data
US 2018/0186367 A1 Jul. 5, 2018

(30) Foreign Application Priority Data
Dec. 30, 2016 (KR) .................. 10-2016-0184295

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC .. G06K 9/00805; B60W 30/09; B60W 50/14; B60W 30/0956; B60W 30/0953;
(Continued)

(56) References Cited

U.S. PATENT DOCUMENTS

2007/0032952 A1 2/2007 Carlstedt et al.
2011/0153166 A1 6/2011 Yester
(Continued)

FOREIGN PATENT DOCUMENTS

DE 10 2010 053350 A1 6/2012
DE 10 2011 112985 A1 3/2013
(Continued)

OTHER PUBLICATIONS

Machine Translation DE 10 2011 112985 published Mar. 2013.*
(Continued)

*Primary Examiner* — Anne Marie Antonucci
(74) *Attorney, Agent, or Firm* — Mintz Levin Cohn Ferris Glovsky and Popeo, P.C.; Peter F. Corless

(57) ABSTRACT

An apparatus for activating a pedestrian detection and collision mitigation system (PDCMS) of a vehicle includes: an engine management system (EMS) acquiring speed information of the vehicle in real-time; an image collecting unit recognizing a pedestrian positioned within a driving lane of the vehicle and detecting information of a relative speed or a distance between the pedestrian and the vehicle, when a speed of the vehicle is greater than or equal to a set speed; and an electronic control unit (ECU) activating a PDCMS function based on a mapping table using the speed information of the vehicle and information of a motion or a distance of the pedestrian with respect to the vehicle, and controlling a warning unit to inform a driver of a collision of the pedestrian with the vehicle. The PDCMS function includes activating an operation of an active hood, activating
(Continued)

an operation of the warning unit, and activating an operation of a brake regardless of whether the driver operates the brake. The activation of the operation of the warning unit and the activation of the operation of the brake comprise, in order: activating the operation of the warning unit, activating a partial braking of the vehicle, and activating a full braking of the vehicle.

13 Claims, 6 Drawing Sheets

(51) Int. Cl.
*G06K 9/00* (2006.01)
*B60W 50/14* (2020.01)
(52) U.S. Cl.
CPC ......... *B60W 50/14* (2013.01); *G06K 9/00805* (2013.01); *B60W 2050/143* (2013.01); *B60W 2050/146* (2013.01); *B60W 2420/40* (2013.01); *B60W 2420/42* (2013.01); *B60W 2420/52* (2013.01); *B60W 2510/182* (2013.01); *B60W 2520/10* (2013.01); *B60W 2520/105* (2013.01); *B60W 2540/12* (2013.01); *B60W 2540/18* (2013.01); *B60W 2550/10* (2013.01); *B60W 2550/12* (2013.01); *B60W 2550/20* (2013.01); *B60W 2710/182* (2013.01); *B60W 2720/10* (2013.01)
(58) Field of Classification Search
CPC ....... B60W 2510/182; B60W 2550/10; B60W 2540/18; B60W 2540/12; B60W 2520/105; B60W 2720/10; B60W 2550/20; B60W 2420/52; B60W 2420/42; B60W 2420/40; B60W 2050/146; B60W 2050/143; B60W 2710/182; B60W 2550/12; B60W 2520/10
See application file for complete search history.

(56) References Cited

U.S. PATENT DOCUMENTS

| 2012/0330541 A1 | 12/2012 | Sakugawa et al. |
| 2014/0343749 A1 | 11/2014 | Minemura et al. |

FOREIGN PATENT DOCUMENTS

| JP | H06-107141 A | 4/1994 |
| JP | 2002-012134 A | 1/2002 |
| JP | 2004-219194 A | 8/2004 |
| JP | 2006-044359 A | 2/2006 |
| JP | 2008-143372 A | 6/2008 |
| JP | 2011-063187 A | 3/2011 |
| JP | 2011-105250 A | 6/2011 |
| JP | 2011-225159 A | 11/2011 |
| WO | 2005/044646 A1 | 5/2005 |

OTHER PUBLICATIONS

European Search Report dated May 30, 2018 in corresponding EP Application No. 17205394.4.
Office Action for Korean Patent Application No. 10-2016-0184295, issued by Korean Patent Office dated Feb. 21, 2019, English translation, 15 pages.

* cited by examiner

[Fig. 1]
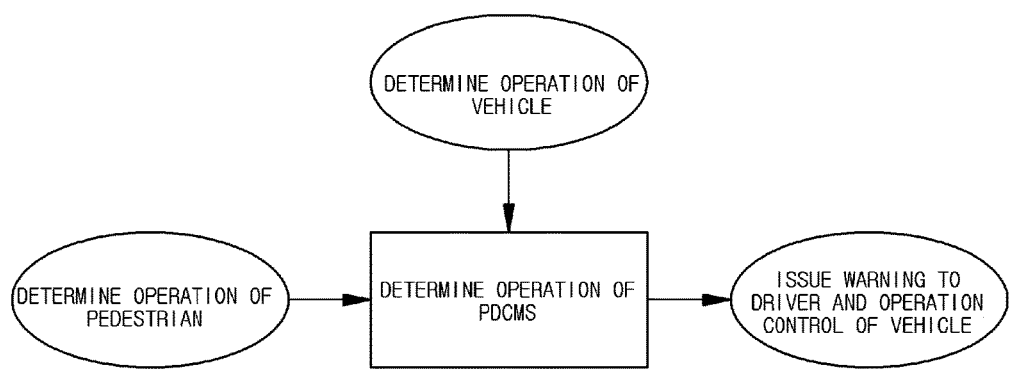
[Fig. 2]
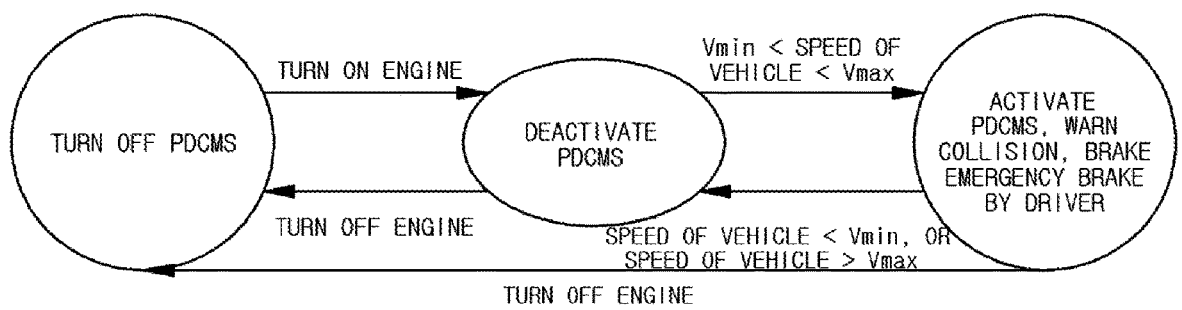

[Fig. 3]
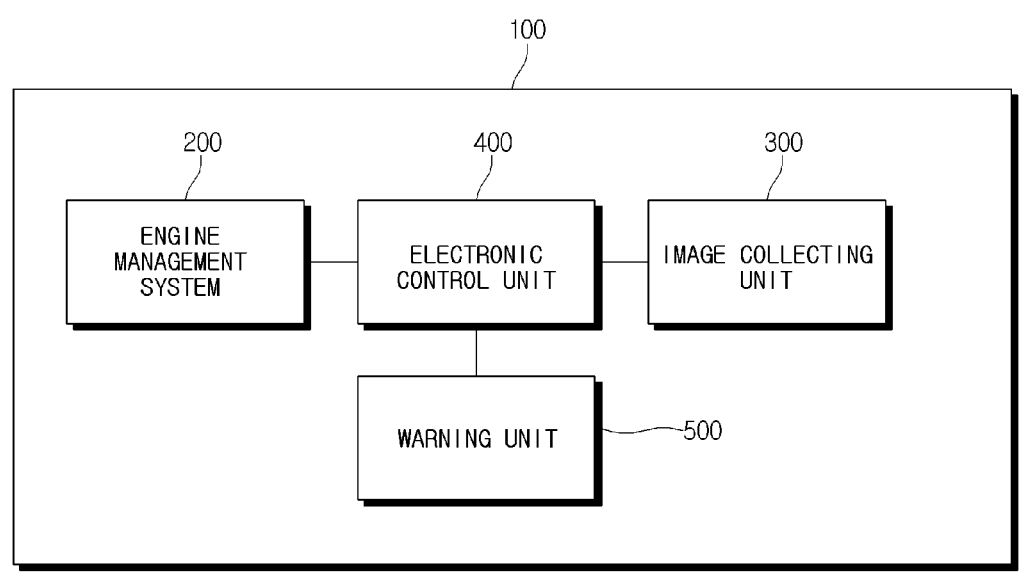

[Fig. 4]
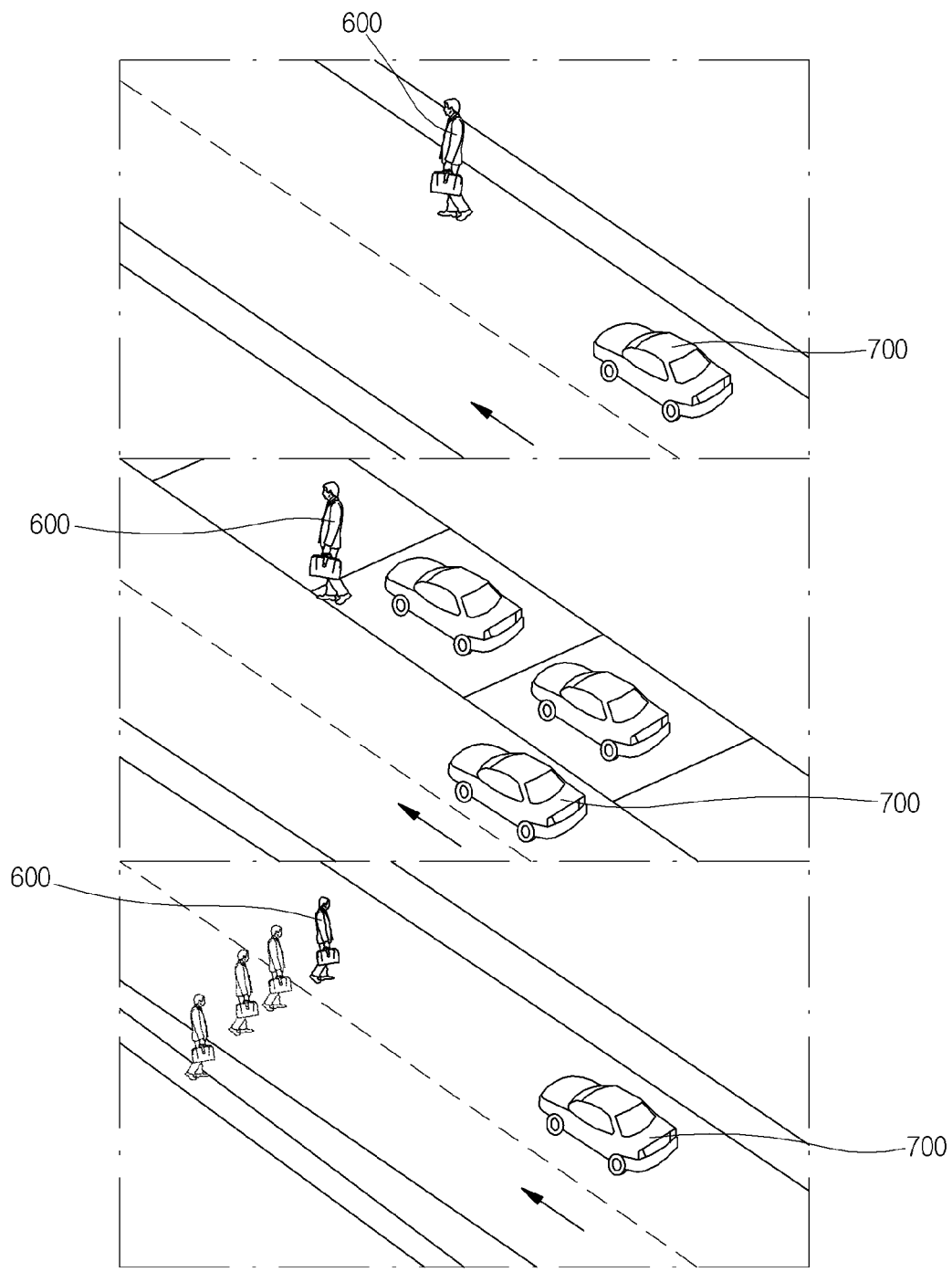

[Fig. 5]
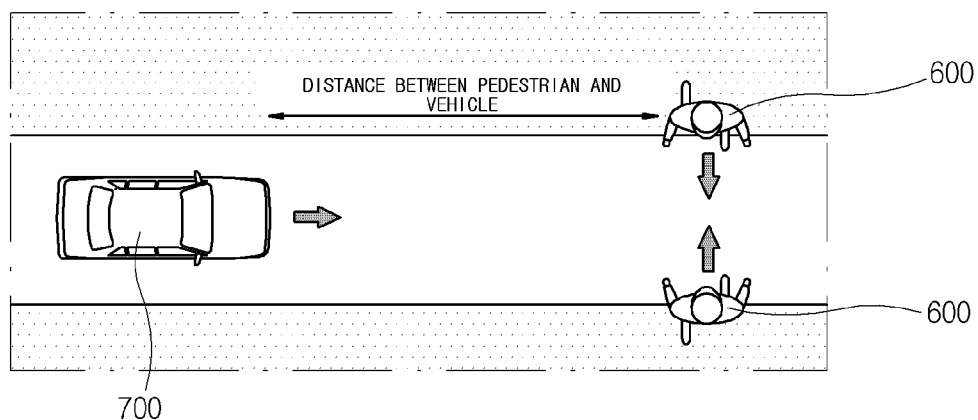
[Fig. 6]
| DISTANCE BETWEEN PEDESTRIAN AND VEHICLE WHEN DRIVER TURNS OFF BRAKE | OPERATE PDCMS FUNCTION | DISTANCE BETWEEN PEDESTRIAN AND VEHICLE WHEN DRIVER TURNS ON BRAKE | OPERATE PDCMS FUNCTION |
|---|---|---|---|
| XXm | NO OPERATION | XXm | NO OPERATION |
| 13m | OPERATION | 10m | OPERATION |
| 0m | NO OPERATION | 0m | NO OPERATION |

[Fig. 7]
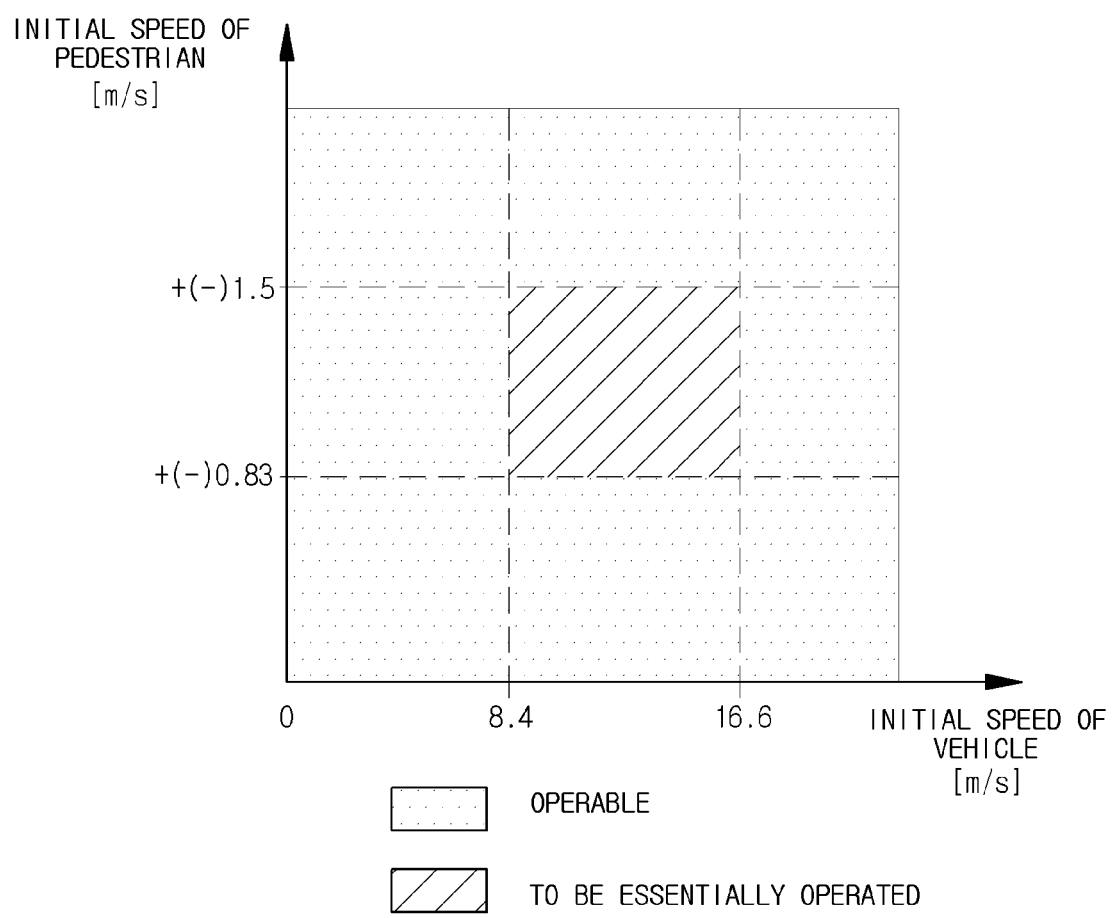

【Fig. 8】
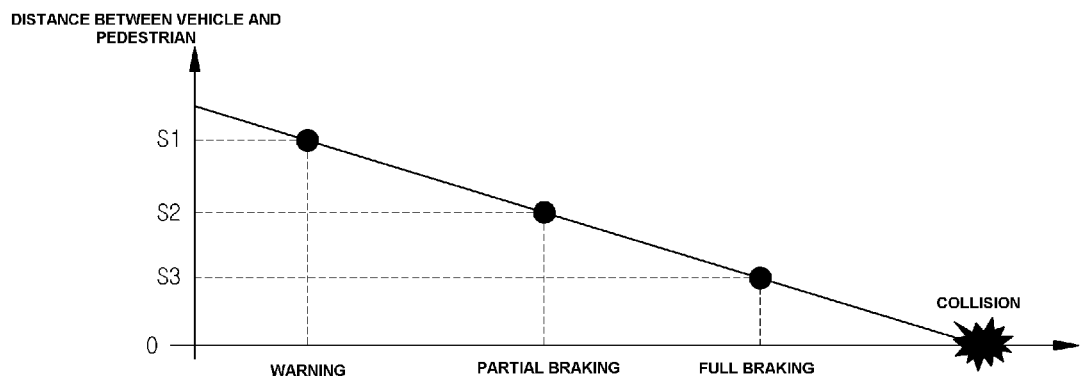
【Fig. 9】
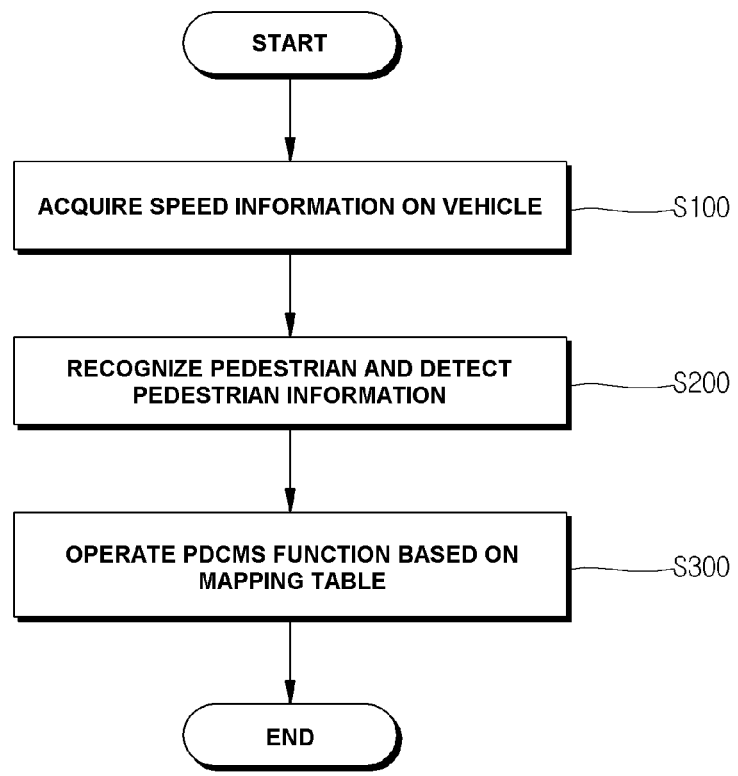

METHOD AND APPARATUS FOR PEDESTRIAN COLLISION MITIGATION

CROSS-REFERENCE TO RELATED APPLICATION

This application claims the benefit of priority to Korean Patent Application No. 10-2016-0184295, filed on Dec. 30, 2016, the disclosure of which is incorporated herein by reference in its entirety.

BACKGROUND

Technical Field

Embodiments of the present disclosure relate generally to a method and an apparatus for operating pedestrian detection and collision mitigation systems (PDCMS) of a vehicle, and more particularly, to an apparatus and a method for operating a PDCMS of a vehicle capable of recognizing a pedestrian using an image pedestrian detection process and activating a PDCMS function in case of an accident.

Description of the Related Art

Recently, advanced driver assistance systems (ADAS) have been developed to assist a driver in driving of a vehicle. The typical ADAS has multiple sub-technology categories. Among those, the ADAS often includes a pedestrian detection and collision mitigation system (PDCMS).

The PDCMS is a technology that warns a driver of a pedestrian collision when a collision with a pedestrian is expected and automatically activates an emergency brake. The PDCMS system may help reduce a speed of the vehicle against inevitable pedestrian collisions, thereby alleviating pedestrian impacts and reducing the lethality and injury rates of pedestrians.

Therefore, development for a specific application of the PDCMS has been required.

SUMMARY

An object of the present disclosure is to provide a system for protecting a pedestrian by detecting the pedestrian using an image pedestrian detection process and activating a PDCMS function using speed information of a vehicle and information of a motion or a distance of the pedestrian with respect to the vehicle.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with embodiments of the present disclosure, an apparatus for activating a pedestrian detection and collision mitigation system (PDCMS) of a vehicle, includes: an engine management system (EMS) acquiring speed information of the vehicle in real-time; an image collecting unit recognizing a pedestrian positioned within a driving lane of the vehicle and detecting information of a relative speed or a distance between the pedestrian and the vehicle, when a speed of the vehicle is greater than or equal to a set speed; and an electronic control unit (ECU) activating a PDCMS function based on a mapping table using the speed information of the vehicle and information of a motion or a distance of the pedestrian with respect to the vehicle, and controlling a warning unit to inform a driver of a collision of the pedestrian with the vehicle. The PDCMS function includes activating an operation of an active hood, activating an operation of the warning unit, and activating an operation of a brake regardless of whether the driver operates the brake. The activation of the operation of the warning unit and the activation of the operation of the brake comprise, in order: activating the operation of the warning unit, activating a partial braking of the vehicle, and activating a full braking of the vehicle.

The mapping table may be a data table for determining the operation of the PDCMS function based on the distance between the pedestrian and the vehicle and whether the brake is operated.

In the mapping table, the distance between the pedestrian and the vehicle may be longer when the brake is not yet operated than when the brake is already operated.

The mapping table may be a data table for determining the operation of the PDCMS function based on the relative speed between the pedestrian and the vehicle and the speed of the vehicle.

The engine management system may measure revolutions per minute (RPM) of a wheel of the vehicle and acquire the speed information of the vehicle based on a known circumference of the wheel and the measured RPM of the wheel.

The image collecting unit may scan an outer portion of a lane nearest to the vehicle to determine whether the pedestrian is positioned within the driving lane of the vehicle.

The ECU may activate the operation of the brake so that the speed of the vehicle is reduced to at least a predetermined speed or more from a time when the operation of the brake is activated to a time when the collision of the pedestrian with the vehicle occurs.

The ECU may permit a driver to operate the brake for a maximum possible deceleration even after the activation of the operation of the brake starts.

The ECU may control the warning unit to inform the driver that the PDCMS function is in an available state.

The warning unit may include a display unit visually informing the driver of the collision of the pedestrian with the vehicle or a speaker unit audibly informing the driver of the collision of the pedestrian with the vehicle.

The PDCMS function may further include activating an operation of a rear brake lamp.

The PDCMS function may further include activating an operation of an electrical stability control (ESC).

Furthermore, in accordance with embodiments of the present disclosure, a method for activating a pedestrian detection and collision mitigation system (PDCMS) of a vehicle includes: acquiring vehicle information including speed information of the vehicle in real-time; detecting pedestrian information including a presence of a pedestrian positioned within a driving lane of the vehicle and a distance and a relative speed between the pedestrian and the vehicle when the speed of the vehicle is greater than or equal to a set speed; activating a PDCMS function based on a mapping table using the vehicle information and the pedestrian information; and controlling a warning unit to inform a driver of a collision of the pedestrian with the vehicle. The PDCMS function includes activating an operation of an active hood, activating an operation of the warning unit, and activating an operation of a brake regardless of whether the driver operates the brake. The activation of the operation of the warning unit and the activation of the operation of the brake comprise, in order: activating the operation of the warning unit, activating a partial braking of the vehicle, and activating a full braking of the vehicle.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram illustrating a schematic concept of a PDCMS;

FIG. 2 is a block diagram illustrating a change in a PDCMS state according to a vehicle;

FIG. 3 is a block diagram schematically illustrating an apparatus for activating a PDCMS of a vehicle according to embodiments of the present disclosure;

FIG. 4 is a diagram illustrating an example of pedestrian recognition within a driving lane according to embodiments of the present disclosure;

FIG. 5 is a diagram illustrating a concept of a pedestrian moving speed;

FIG. 6 is a diagram illustrating an example of a mapping table for operating the PDCMS function according to embodiments of the present disclosure;

FIG. 7 is a diagram illustrating an example of a mapping table for operating the PDCMS function according to embodiments of the present disclosure;

FIG. 8 is a diagram illustrating an example of an operation of the PDCMS function according to embodiments of the present disclosure; and FIG. 9 is a flow chart illustrating a flow of a method for activating a PDCMS function according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF SPECIFIC EMBODIMENTS

Hereinafter, embodiments of the present disclosure will be described in detail with reference to the accompanying drawings so that those skilled in the art may easily practice the present disclosure. As those skilled in the art would realize, the described embodiments may be modified in various different ways, all without departing from the spirit or scope of the present disclosure.

Parts irrelevant to the description will be omitted to clearly describe the present disclosure, and the same elements will be designated by the same reference numerals throughout the specification.

Throughout the present specification, when any one part is referred to as being "connected to" another part, it means that any one part and another part are "directly connected to" each other or are "electrically connected to" each other with the other part interposed therebetween. Further, unless explicitly described to the contrary, "comprising" any components will be understood to imply the inclusion of other components rather than the exclusion of any other components.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. may be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present disclosure.

Terminologies used herein are to mention only a specific exemplary embodiment, and does not limit the present disclosure. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other specific properties, regions, integer numbers, steps, operations, elements, components, and/or a group thereof.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

Moreover, in connection with the extent that the term "include" in the detailed description or the appended claims is used, the term are intended to be inclusive in a manner similar to "consisting" as interpreted when the term "configured" is used as a transitional word in the appended claim.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit (or electronic control unit (ECU)). The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

All terms including technical terms and scientific terms used herein have the same meaning as the meaning generally understood by those skilled in the art to which the present disclosure pertains unless defined otherwise. Terms defined in a generally used dictionary are additionally interpreted as having the meaning matched to the related art document and the currently disclosed contents and are not interpreted as ideal or formal meaning unless defined.

Referring now to embodiments of the present disclosure, FIG. 1 is a diagram illustrating a schematic concept of a PDCMS.

The PDCMS is a technology that warns a driver of a pedestrian collision when a collision of a pedestrian with a vehicle is expected and automatically activates an emergency brake. As shown in FIG. 1, it is determined whether the PDCMS is operated based on an operation determination of a pedestrian and an operation determination of a vehicle. When the operation of the PDCMS is determined, the PDCMS function is performed by issuing a warning to driver and activating a vehicle control.

A system designer may design the PDCMS function to operate solely in the risk of collision of a pedestrian with a vehicle or may design the PDCMS function to operate in a combination with other driving assistance systems.

FIG. 2 is a block diagram illustrating a change in a PDCMS state according to a vehicle.

In a PDCMS off state, no action is taken on the operation of the vehicle. The PDCMS off state occurs when an engine of a vehicle stalls.

In the PDCMS deactivation state, the apparatus for activating a PDCMS monitors a speed of a vehicle and determine whether the PDCMS is in an appropriate state to activate. The PDCMS deactivation state is achieved by turning on the engine in the PDCMS off state. Further, the PDCMS deactivation state is performed even when the vehicle is in a state other than the condition that the vehicle is activated from the PDCMS activation state. For example, when the speed of the vehicle falls below a predetermined value Vmin, the PDCMS deactivation state is established.

The PDCMS activation state is established when the speed of the vehicle is equal to or greater than the predetermined value Vmin and equal to or less than a predetermined value Vmax. To determine whether to operate the PDCMS function in the PDCMS activation state, an operation of a pedestrian and an operation of a vehicle are monitored. When the apparatus for activating a PDCMS determines that the PDCMS function needs to be operated, the PDCMS function starts. The PDCMS function includes a collision warning to a driver and an operation of an emergency brake or optionally includes braking actions by a driver.

FIG. 3 is a block diagram schematically illustrating an apparatus for activating a PDCMS of a vehicle according to embodiments of the present disclosure.

As shown in FIG. 3, an apparatus 100 for activating a PDCMS of a vehicle according to embodiments of the present disclosure includes an engine management system 200, an image collecting unit 300, an electronic control unit 400, and a warning unit 500.

The engine management system 200 measures revolutions per minute (RPM) of a vehicle wheel based on a vehicle engine and calculates a driving speed of a vehicle based on the known circumference of the wheel and the measured RPM and time. Further, the engine management system 200 may ascertain whether a brake pedal is operated. The engine management system 200 transmits information on the calculated driving speed and whether a brake pedal is operated to the electronic control unit 400.

The image collecting unit 300 is operated by the control of the electronic control unit 400. The electronic control unit 400 controls the image collecting unit 300 when the speed of the vehicle received from the engine management system 200 is equal to or greater than a set first speed.

The image collecting unit 300 may be configured to look forward to collect images in front of the vehicle, but is not configured only to look at the front of the vehicle. The image collecting unit 300 may extract characteristics of obstacles detected in front of the vehicle to identify objects and detect various objects such as vehicles on a roadside as well as pedestrians. The image collecting unit 300 may detect even parts configuring a pedestrian as well as the overall appearance of the pedestrian to detect the pedestrian even when only a part of the pedestrian covered by various objects such as vehicles on a roadside is detected. The image collecting unit 300 transmits information on the detected pedestrian to an electronic control unit 400.

The electronic control unit 400 determines whether to operate the PDCMS function of the vehicle based on the information received from the image collecting unit 300 and the engine management system 200. Specifically, the electronic control unit 400 determines whether the conditions that the PDCMS function may be operated are satisfied by combining the pedestrian state and the vehicle state. That is, the electronic control unit 400 determines the risk of collision between a vehicle and a pedestrian using a current position of the pedestrian, a current position of the vehicle, and speed information on the vehicle if it is determined that an obstacle is the pedestrian. For example, when the distance between the pedestrian and the vehicle is below a predetermined distance and a motion direction of the pedestrian and a movement direction of the vehicle are the same, the collision is highly likely to occur, and therefore it is determined that the conditions that the PDCMS function may be operated are satisfied and when the distance between the pedestrian and the vehicle is below the predetermined distance but the motion direction of the pedestrian and the movement direction of the vehicle are different, the collision is less likely to occur, and therefore it is determined that the conditions that the PDCMS function may be operated are not satisfied.

Preferably, the electronic control unit 400 determines whether the conditions that the PDCMS function may be operated are satisfied based on the mapping table. The mapping table will be described below with reference to FIGS. 6 and 7.

The electronic control unit 400 operates the PDCMS function of the vehicle if it is determined that the pedestrian state and the vehicle state satisfy the condition that the PDCMS function may be started. The PDCMS function includes operating an active hood, operating the warning unit 500 to warn the driver of the collision of the pedestrian with the vehicle, or operating the brake without the operation of the driver.

The active hood is used to lift up a bonnet on the front of the vehicle to mitigate the impact on a pedestrian's head. In addition, to protect the pedestrian's head while operating the active hood, a pedestrian protection airbag for protecting a pedestrian may be provided at positions such as a lower portion of a front glass and an upper portion of an A-pillar and a hood.

Warning the driver of the collision of the pedestrian with the vehicle is performed by operating the warning unit 500. The warning unit 500 is operated by the control of the electronic control unit 400. The warning unit 500 may include a display unit or a speaker unit. The display unit included in the warning unit 500 may provide a driver with a visual warning through a head-up display, a navigation display, etc. The speaker unit included in the warning unit 500 may provide a driver with an audible warning through an audio. The content of the warning that the warning unit 500 performs is that there is a potential risk of collision of the pedestrian with the vehicle since obstacles exist in the front of a driving lane of the vehicle.

The activation of the operation of the brake regardless of whether the driver operates the brake is performed only by the control of the electronic control unit 400 without the operation of the driver. The activation of the operation of the brake is to automatically reduce the relative speed between the vehicle and the pedestrian if it is found that the pedestrian collision is just around the corner.

The activation of the operation of the brake is performed in order of a partial braking and a full braking after the warning by the warning unit is performed by steps depending on the distance between the vehicle and the pedestrian. This will be described below with reference to FIG. 8.

The activation of the operation of the brake is performed so that the speed of the vehicle may be reduced to at least a predetermined speed or more from the time when the operation of the brake is activated to the time when the collision of the pedestrian with the vehicle occurs. Preferably, the predetermined speed may be 20 km/h.

Further, even after the activation of the operation of the brake starts, the driver manually operates the brake, thereby performing the maximum possible deceleration. That is, the driver may manually operate the brake so that the speed of the vehicle is reduced more than the predetermined speed. For example, the driver may manually operate the brake so that the speed of the vehicle is maximally decelerated to 20 km/h or more that is the predetermined speed.

In addition, the electronic control unit 400 may inform a driver that the PDCMS function is in an available state. Specifically, the electronic control unit 400 controls the warning unit 500 to inform the driver that the PDCMS function is in the available state through the display unit or the speaker unit of the warning unit 500.

In addition, the PDCMS function may control an operation of a brake lamp to prevent the potential risk of collision with the following vehicles.

In addition, the PDCMS function may further include an operation of an electrical stability control (ESC). The ESC is an apparatus that allows a vehicle itself to intervene in an operation of a brake in an emergency situation such as an oversteer (e.g., when a vehicle enters inwardly beyond a turning radius of a road) or an understeer (e.g., when a vehicle deviates outwardly beyond the turning radius of the road) of a vehicle to thereby help a driver to escape from an emergency situation.

FIG. 4 is a diagram illustrating an example of pedestrian recognition within a driving lane according to embodiments of the present disclosure.

As shown in FIG. 4, the image collecting unit 300 may detect a pattern of a pedestrian including a shape, a position, and a direction of a pedestrian, angles of arms and legs of a pedestrian, and the like.

The image collecting unit 300 extracts a lane area by applying a horizontal distance calculation based algorithm to obtain information on a lane while the vehicle is driving. The image collecting unit 300 starts to scan a lane nearest to the vehicle and collects the presence or absence of a pedestrian who is moving within a driving lane of the vehicle.

For example, when a pedestrian 600 is positioned at a center of a crosswalk within a driving lane, the pedestrian 600 moves toward a vehicle 700, or the angles of the arms and legs of the pedestrian 600 are within a set angle (15° to 30°), it may be determined that the pedestrian is a pedestrian who is moving within the driving lane. On the other hand, when the pedestrian 600 moves in the opposite direction to the vehicle 700 or the angles of the limbs of the pedestrian 600 are smaller than the set angle, for example, 0° to 10°, it may be determined that the pedestrian is not a pedestrian who is moving within the driving lane.

FIG. 5 is a diagram illustrating a concept of a pedestrian moving speed.

As shown in FIG. 5, the image collecting unit 300 may detect the distance between the pedestrian 600 and the vehicle 700 that are moving within a driving lane and the moving speed of the pedestrian 600.

For example, if the pedestrian 600 moves from the left to the right with respect to a front view of the vehicle 700, the pedestrian 600 has a negative (−) moving speed and if the pedestrian 600 moves from the right to left with respect to the front view of the vehicle 700, the pedestrian 600 has a positive (+) moving speed.

In addition, the image collecting unit 300 may detect the distance between the vehicle 700 and the pedestrian 600 that are moving on the driving lane of the vehicle based on the collected image in front of the vehicle.

FIG. 6 is a diagram illustrating an example of a mapping table for operating the PDCMS function according to embodiments of the present disclosure.

The electronic control unit 400 uses the mapping table to determine the risk of collision of the pedestrian with the vehicle, and furthermore, whether the PDCMS function is operated.

As shown in FIG. 6, the PDCMS function may be operated depending on whether the brake is operated, compared with the distance between the pedestrian and the vehicle.

Specifically, the distance for determining the operation of the PDCMS function is longer when the brake is not yet operated than when the brake is already operated. Because the PDCMS reduces the speed of the vehicle by at least a predetermined speed, the PDCMS function requires a longer distance for a deceleration when the brake is not yet operated in order to reduce the impact on the pedestrian.

Also, the PDCMS function is not operated when the distance between the pedestrian and the vehicle is too long or the pedestrian and the vehicle are already in contact with each other.

FIG. 7 is a diagram illustrating an example of the mapping table for operating the PDCMS function according to embodiments of the present disclosure.

The electronic control unit 400 uses the mapping table to determine the risk of collision of the pedestrian with the vehicle, and furthermore, whether the PDCMS function is operated.

As shown in FIG. 7, the electronic control unit 400 determines the operation of the PDCMS function based on an initial speed at a boundary of a driving lane on which the pedestrian moves and an initial speed of the vehicle.

Specifically, if an absolute value of the initial speed at the boundary of the driving lane on which the pedestrian is moving and the initial speed of the vehicle are in an area in which the PDCMS function is essentially operated at the time of determining whether the PDCMS function is operated, the electronic control unit 400 determines that the PDCMS function is operated. The operation possible area means the area in which the Vmin or the Vmax may be adjusted according to the manufacturer's selection.

For example, if the speed of the vehicle falls below 8.4 m/s (30 km/h) as the Vmin or rises above 16.6 m/s (60 km/h) as the Vmax, then the electronic control unit 400 may determine that the PDCMS is in the deactivation state and thus the PDCMS function is not operated.

Further, when the initial speed of the vehicle is between the Vmin and the Vmax and the absolute value of the initial speed at the boundary of the driving lane on which the pedestrian is moving is between 0.83 m/s and 1.5 m/s, the electronic control unit 400 may determine that the PDCMS function is operated.

FIG. 8 is a diagram illustrating an example of the operation of the PDCMS function according to embodiments of the present disclosure. A vertical axis represents time to collision (TTC) derived from the distance between the vehicle and the pedestrian and the relative speed of the pedestrian and a horizontal axis represents the operation of the PDCMS function of the vehicle.

The electronic control unit 400 performs the PDCMS operation by steps according to the distance between the vehicle and the pedestrian.

That is, when $t_1 > t_2 > t_3$ for $t_1$, $t_2$, and $t_3$ which are different TTCs, if the TTC of the vehicle and the pedestrian is $t_1$, the warning is issued to the driver through the warning unit 500, if the TTC of the vehicle and the pedestrian is $t_2$, the vehicle is partially braked, and if the TTC of the vehicle and the pedestrian is $t_3$, the vehicle is fully braked.

The warning of the warning unit 500 may include the visual warning through the display unit or the audible warning through the speaker unit.

The partial braking means reducing the speed of the vehicle to at least a predetermined speed or more and the full braking means maximally reducing the speed of the vehicle.

However, even after the PDCMS function is operated, the driver may manually operate the brake to perform the maximum possible deceleration. That is, the driver may manually operate the brake to reduce the speed of the vehicle more than the sequential deceleration according to the PDCMS function.

FIG. 9 is a flow chart illustrating a flow of a method for activating a PDCMS function according to embodiments of the present disclosure.

As shown in FIG. 9, a method of activating a pedestrian detection and collision mitigation system (PDCMS) function of an vehicle according to embodiments of the present disclosure includes acquiring vehicle information including speed information on the vehicle in real-time (S100), detecting pedestrian information including a presence of a pedestrian on a driving lane of the vehicle and a distance and a relative speed between the pedestrian and the vehicle when the speed of the vehicle is equal to or greater than a set speed (S200), and operating the PDCMS function based on the mapping table using the vehicle information and the pedestrian information (S300).

In the acquiring of the vehicle information including the speed information on the vehicle in real-time (S100), the number of RPMs of the vehicle wheel is measured based on the vehicle engine and the driving speed of the vehicle is calculated based on the known circumference of the wheel and the measured number of RPM and time. Further, it is possible to ascertain whether the brake pedal is operated.

In the detecting of the pedestrian information including the presence of the pedestrian on the driving lane of the vehicle and the distance and the relative speed between the pedestrian and the vehicle when the speed of the vehicle is equal to or greater than the set speed (S200), when the acquired driving speed of the vehicle is equal to or greater than the set first speed, the characteristics of obstacles detected in front of the vehicle may be extracted to identify objects and various objects such as vehicles on a roadside as well as pedestrians may be detected. Specifically, even parts configuring the pedestrian as well as the overall appearance of the pedestrian may be detected, and thus the pedestrian may be detected even when only a part of the pedestrian covered by various objects such as vehicles on a roadside is detected. Further, for the detected pedestrian, the distance between the pedestrian and the vehicle and the moving speed of the pedestrian may be detected.

In the operating of the PDCMS function based on the mapping table using the vehicle information and the pedestrian information (S300), it is determined whether to operate the PDCMS function of the vehicle based on the mapping table using the acquired vehicle information and the detected pedestrian information. Specifically, it is determined whether the conditions that the PDCMS function on the mapping table may be operated are satisfied based on the combination of the pedestrian state and the vehicle state. That is, if it is determined that an obstacle is a pedestrian, the risk of collision of the pedestrian with the vehicle is determined on the mapping table using the current position of the pedestrian, the current position of the vehicle, and the speed information on the vehicle.

Further, in the operating of the PDCMS function based on the mapping table using the vehicle information and the pedestrian information (S300), the PDCMS function of the vehicle is operated if it is determined that the pedestrian state and the vehicle state satisfy the conditions that the PDCMS function may start on the mapping table. The PDCMS function includes activating the operation of the warning unit to inform the driver of the collision of the pedestrian with the vehicle and activating the operation of the brake regardless of whether the driver operates the brake, and the activation of the operation of the warning unit and the activation of the operation of the brake are performed in order of the operation of the warning unit, the partial braking of the vehicle, and the full braking of the vehicle.

Meanwhile, it should be understood that the PDCMS was described as an example for convenience of description in the present specification. As described above, it should be understood that the PDCMS is only one of several ADAS functions, and that the PDCMS implementations presented by the present disclosure may also be used to implement other ADAS functions involved. For example, the system presented by the present disclosure may be applied to implement one or a combination of ADAS functions such as the PDCMS, a lane change decision aid system (LCDAS), a land departure warning system (LDWS), an adaptive cruise control (ACC), a lane keeping assistance system (LKAS), a road boundary departure prevention system (RBDPS), a curve speed warning system (CSWS), a forward vehicle collision warning system (FVCWS), and low speed following (LSF).

According to embodiments of the present disclosure, the apparatus for activating a PDCMS of a vehicle may warn the driver of the pedestrian collision and automatically activate the emergency brake to lower the speed of the vehicle when there is the possibility of collision.

The foregoing includes examples of one or more embodiments. Of course, all possible combinations of components or methods for the purpose of describing the embodiments described above are not described, but those skilled in the art may recognize that many combinations and substitutions of various embodiments are possible. Accordingly, the described embodiments are intended to embrace all the alternatives, modifications and variations that fall within the spirit and scope of the appended claims.

What is claimed is:

1. An apparatus for activating a pedestrian detection and collision mitigation system (PDCMS) of a vehicle, comprising:
   an engine management system (EMS) acquiring speed information of the vehicle in real-time;
   an image collecting unit recognizing a pedestrian positioned within a driving lane of the vehicle and detecting information of a relative speed or a distance between the pedestrian and the vehicle; and
   an electronic control unit (ECU) activating a PDCMS function based on a mapping table using the speed information of the vehicle and information of a motion or a distance of the pedestrian with respect to the vehicle, and controlling a warning unit to inform a driver of a collision of the pedestrian with the vehicle, wherein
   the PDCMS function includes activating an operation of an active hood, activating an operation of the warning unit, and activating an operation of a brake regardless of whether the driver operates the brake, and
   the activation of the operation of the warning unit and the activation of the operation of the brake comprise, in order: activating the operation of the warning unit, activating a partial braking of the vehicle, and activating a full braking of the vehicle, and
   wherein the electronic control unit is further configured to determine that the PDCMS function is operated, if the speed of the vehicle is within a first speed range and a speed of the pedestrian on a driving lane on which the pedestrian is moving is within a second speed range.

2. The apparatus of claim 1, wherein the mapping table is a data table for determining the activation of the PDCMS function based on the distance between the pedestrian and the vehicle and whether the brake is operated.

3. The apparatus of claim 2, wherein, in the mapping table, the distance between the pedestrian and the vehicle is longer when the brake is not yet operated than when the brake is already operated.

4. The apparatus of claim 1, wherein the mapping table is a data table for determining the activation of the PDCMS function based on the relative speed between the pedestrian and the vehicle and the speed of the vehicle.

5. The apparatus of claim 1, wherein the engine management system measures revolutions per minute (RPM) of a wheel of the vehicle and acquires the speed information of the vehicle based on a known circumference of the wheel and the measured RPM of the wheel.

6. The apparatus of claim 1, wherein the image collecting unit scans an outer portion of a lane nearest to the vehicle to determine whether the pedestrian is positioned within the driving lane of the vehicle.

7. The apparatus of claim 1, wherein the ECU activates the operation of the brake so that the speed of the vehicle is reduced to at least a predetermined speed or more from a time when the operation of the brake is activated to a time when the collision of the pedestrian with the vehicle occurs.

8. The apparatus of claim 1, wherein the ECU permits a driver to operate the brake for a maximum possible deceleration even after the activation of the operation of the brake starts.

9. The apparatus of claim 1, wherein the ECU controls the warning unit to inform the driver that the PDCMS function is in an available state.

10. The apparatus of claim 1, wherein the warning unit includes a display unit visually informing the driver of the collision of the pedestrian with the vehicle or a speaker unit audibly informing the driver of the collision of the pedestrian with the vehicle.

11. The apparatus of claim 1, wherein the PDCMS function further includes activating an operation of a rear brake lamp.

12. The apparatus of claim 1, wherein the PDCMS function further includes activating an operation of an electrical stability control (ESC).

13. A method for activating a pedestrian detection and collision mitigation system (PDCMS) of a vehicle, comprising:
   acquiring vehicle information including speed information of the vehicle in real-time;
   detecting pedestrian information including a presence of a pedestrian positioned within a driving lane of the vehicle and a distance and a relative speed between the pedestrian and the vehicle;
   activating a PDCMS function based on a mapping table using the vehicle information and the pedestrian information; and
   controlling a warning unit to inform a driver of a collision of the pedestrian with the vehicle, wherein
   the PDCMS function includes activating an operation of an active hood, activating an operation of the warning unit, and activating an operation of a brake regardless of whether the driver operates the brake,
   the activation of the operation of the warning unit and the activation of the operation of the brake comprise, in order: activating the operation of the warning unit, activating a partial braking of the vehicle, and activating a full braking of the vehicle, and
   wherein the method further includes determining that the PDCMS function is operated, if the speed of the vehicle is within a first speed range and a speed of the pedestrian on a driving lane on which the pedestrian is moving is within a second speed range.

* * * * *